June 7, 1932.   W. HEMPEL   1,861,531
MEANS FOR SIDE DRESSING CIRCULAR SAWS
Filed Aug. 21, 1929
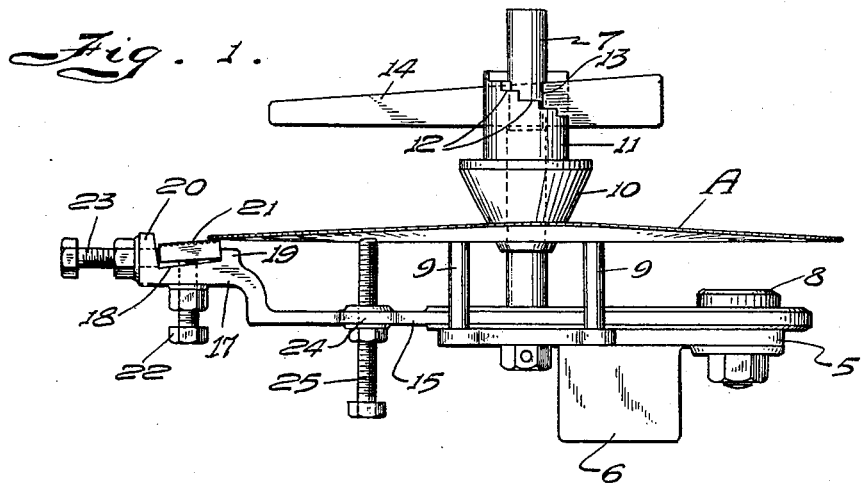
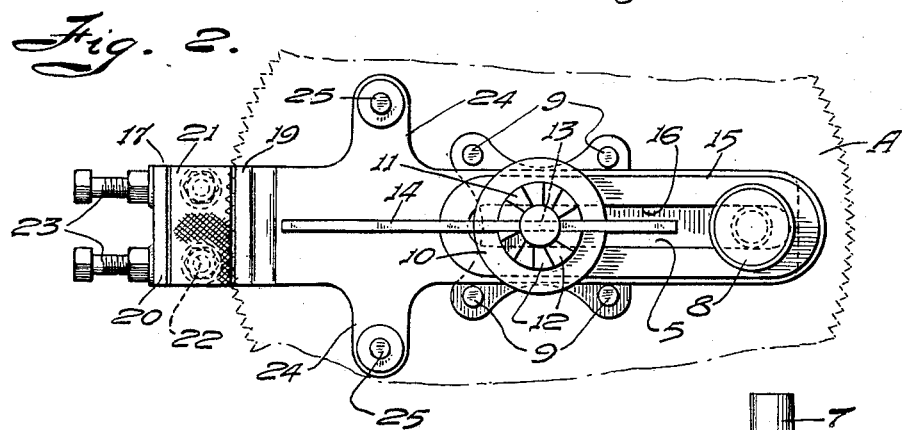
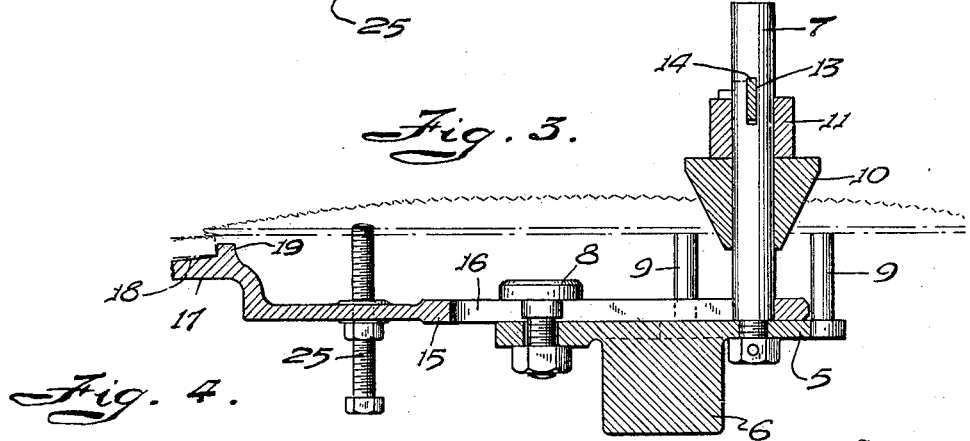
Inventor
WILLIAM HEMPEL
By
Attorney Patented June 7, 1932

1,861,531

UNITED STATES PATENT OFFICE

WILLIAM HEMPEL, OF NORTH TONAWANDA, NEW YORK

MEANS FOR SIDE DRESSING CIRCULAR SAWS

Application filed August 21, 1929. Serial No. 387,491.

The object of the present invention is to provide a simple and effective means for side dressing circular saws, the mechanism being adjustable so that saws of various diameters can be operated on. With this structure the saw teeth can be accurately dressed so that the saw markings are substantially eliminated and a smooth even cut can be produced.

In the accompanying drawing:

Figure 1 is a side elevation of the preferred embodiment of the invention with a saw in place thereon.

Figure 2 is a plan view of the implement.

Figure 3 is a longitudinal sectional view but with the saw arbor in reversed position to that shown in Figures 1 and 2.

Figure 4 is a bottom plan view of the base member.

In the embodiment disclosed, a base member 5 is employed having a depending integral block 6 adapted to be gripped in the jaws of a vise, so that the base can be firmly supported and held. This base has projecting from one side of the block 6, an upstanding saw-holding arbor 7, and on the opposite side of the block the base is provided with a clamping bolt 8. The arbor 7 is centrally located with respect to a plurality of (preferably 4) upstanding saw-supporting posts 9 fixed to the base. Said arbor furthermore has a cone-shaped wedge 10 slidably mounted thereon, and bearing upon this wedge is a holding nut 11 provided with an annular series of stepped shoulders 12. The upper end portion of the arbor is provided with a transverse slot 13 through which is passed a wedge 14 adapted to bear upon any of the said shoulders 12.

Mounted on the base 5 is an arm 15 provided with a longitudinal slot 16 through which the clamping bolt 8 and arbor 7 pass. This arm extends beyond the base and has at its end a holder 17 for a dressing tool. This holder preferably consists of a seat 18 having upstanding end walls 19 and 20. In the seat is placed a file 21 that can be vertically adjusted by screws 22 threaded through the base of the seat and bearing against the underside of the file 21. Clamping bolts 23 passing through the end wall 20, serve to grip the file 21 against the end wall 19. The arm 15 is furthermore provided with oppositely outstanding ears 24 through which are threaded adjustable positioning posts in the form of screws 25. It will be noted by reference to Figure 2 that these posts 25 are on opposite sides of a line intersecting the axis of the arbor 7 and the central portion of the file or dressing tool 21.

In using this device, as already stated, it is gripped in a vise or other suitable holder and the arm 15 is adjusted so that a circular saw as A placed upon the arbor, has its teeth resting upon the upper active surface of the file or dressing tool 21. The saw is centered by the cone 10, which in turn is held by the nut 11 and wedge 13. Furthermore the saw is preferably flexed slightly by vertically adjusting the posts 25 so that only a predetermined portion of the saw teeth rests upon the dressing tool or file 21. The saw having been properly placed in position is then rotated by hand and the underside of the teeth are caused to pass over the file 21 so that they are all accurately and evenly dressed. The saw blade can then be reversed and the opposite side similarly treated. By reason of the structural arrangement of the arbor 7 and clamping bolt 8, obviously the base can be reversed with respect to the arm, so that the arbor 7 can be located at different distances from the dressing tool and a slight adjustment can be made in either case.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In apparatus for the purposes set forth, the combination with a base, of a saw holding arbor projecting therefrom, a clamping bolt on the base at one side of the arbor and substantially parallel thereto, an arm mounted on the base and slotted to receive the arbor and bolt, said base and arm being relatively reversible to reverse the positions of the arbor and both in the slot, and a tool holder carried by the arm, said reversibility permitting the arbor being placed different distances from the tool.

2. In apparatus for the purposes set forth, the combination with a base having a vise-engaging lug, a saw holding arbor projecting from the base and a clamping bolt at one side of the arbor and substantially parallel thereto, coacting means on the base and arbor for positioning a saw thereon, an arm adjustable on the base and having a slot through which the arbor and bolt pass, a tool holding clamp on the arm, and adjustable saw-engaging posts on the arm on opposite sides of a line intersecting the arbor and tool holding clamp.

3. In saw dressing apparatus, the combination with a base, of a saw positioning arbor mounted thereon, saw blade engaging devices upstanding from the base, a saw blade holding device adjustably mounted on the arbor to fix the blade thereon and cause it to be pressed upon and flexed by the said blade engaging devices, and a dressing tool holder mounted on the base, said saw engaging devices being located on opposite sides of a line intersecting the dressing tool holder and the arbor.

4. In saw dressing apparatus, the combination with a base, of a saw positioning arbor mounted thereon, sets of saw blade engaging posts located on the base and spaced from the arbor, a saw blade holding device adjustably mounted on the arbor to fix the blade thereon and cause it to be pressed upon and flexed by the said posts, and a dressing tool holder mounted on the base, said posts being on opposite sides of a line intersecting the dressing tool holder and the arbor.

5. In a saw dressing apparatus, the combination with a base having a saw positioning arbor, of saw blade supports on opposite sides of and spaced from the arbor, an arm adjustably mounted on the base between the saw supports, and a holder for a dressing tool carried by the arm.

6. In a saw dressing apparatus, the combination with a base having a saw positioning arbor, of saw blade supports on opposite sides of and spaced from the arbor, an arm adjustably mounted on the base between the saw supports and having a slot through which the arbor passes, a clamping bolt for the arm engaged with the base and passing through the slot, and a holder for a dressing tool carried by the arm.

7. In a saw dressing apparatus, the combination with a base having a saw positioning arbor, of saw blade supports on opposite sides of and spaced from the arbor, an arm adjustably mounted on the base between the saw supports, a holder for a dressing tool mounted on the free end of the arm, and spaced positioning posts adjustably mounted on the arm between the supports and the tool holder.

8. In a saw dressing apparatus, the combination with a base having a depending block and an upstanding saw positioning arbor, of a plurality of spaced upstanding saw positioning posts on the base on different sides of the arbor, a saw clamping device on the arbor, an arm slidably mounted on the base and projecting therefrom, the portion on the base having a longitudinal slot through which the arbor passes, a holding bolt for the arm also passing through the slot, a holder for a dressing tool on the outer end of the arm, and saw positioning posts adjustably mounted on the projecting portion of the arm between the tool holder and the arbor.

In testimony whereof, I affix my signature.

WILLIAM HEMPEL.